UNITED STATES PATENT OFFICE.

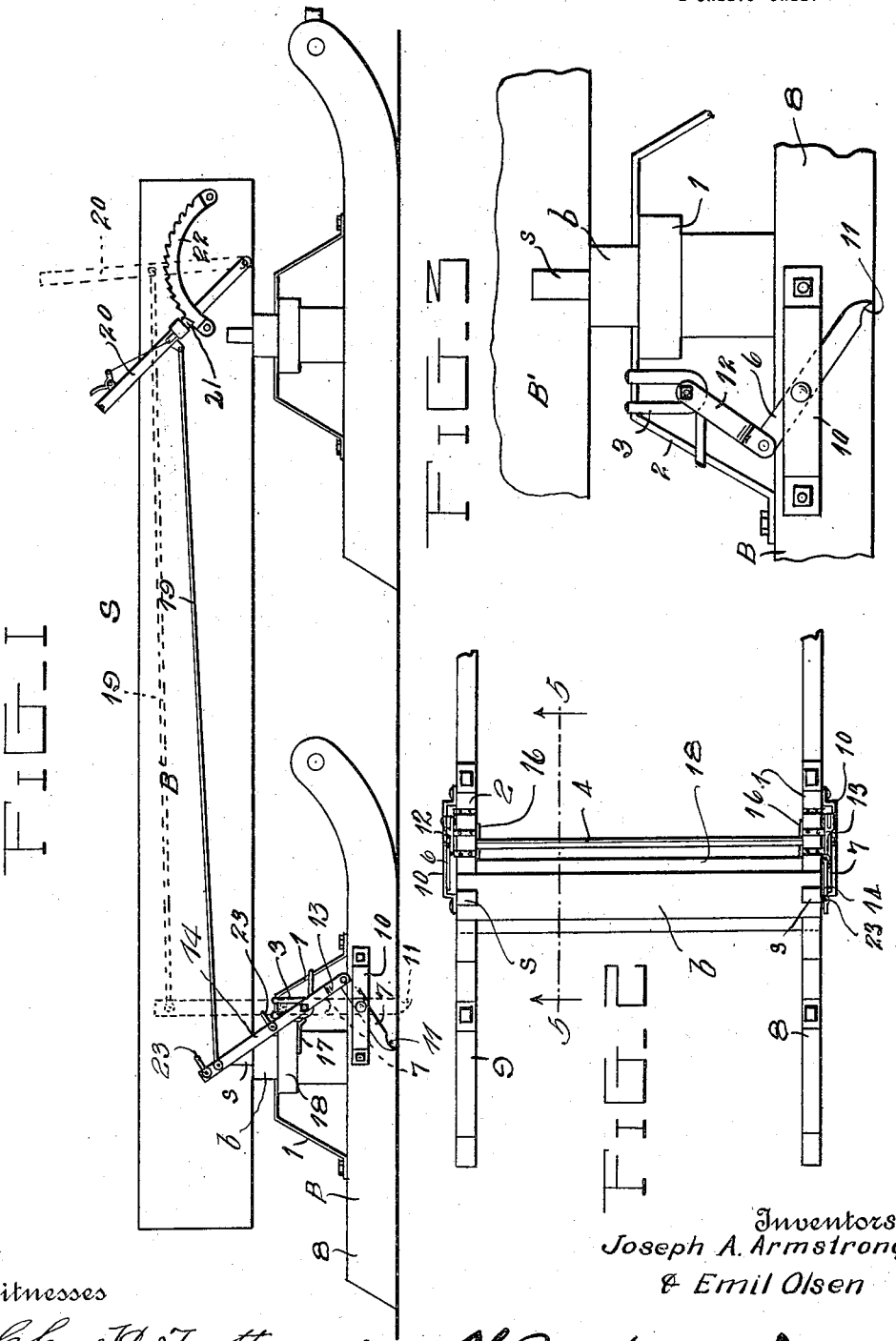

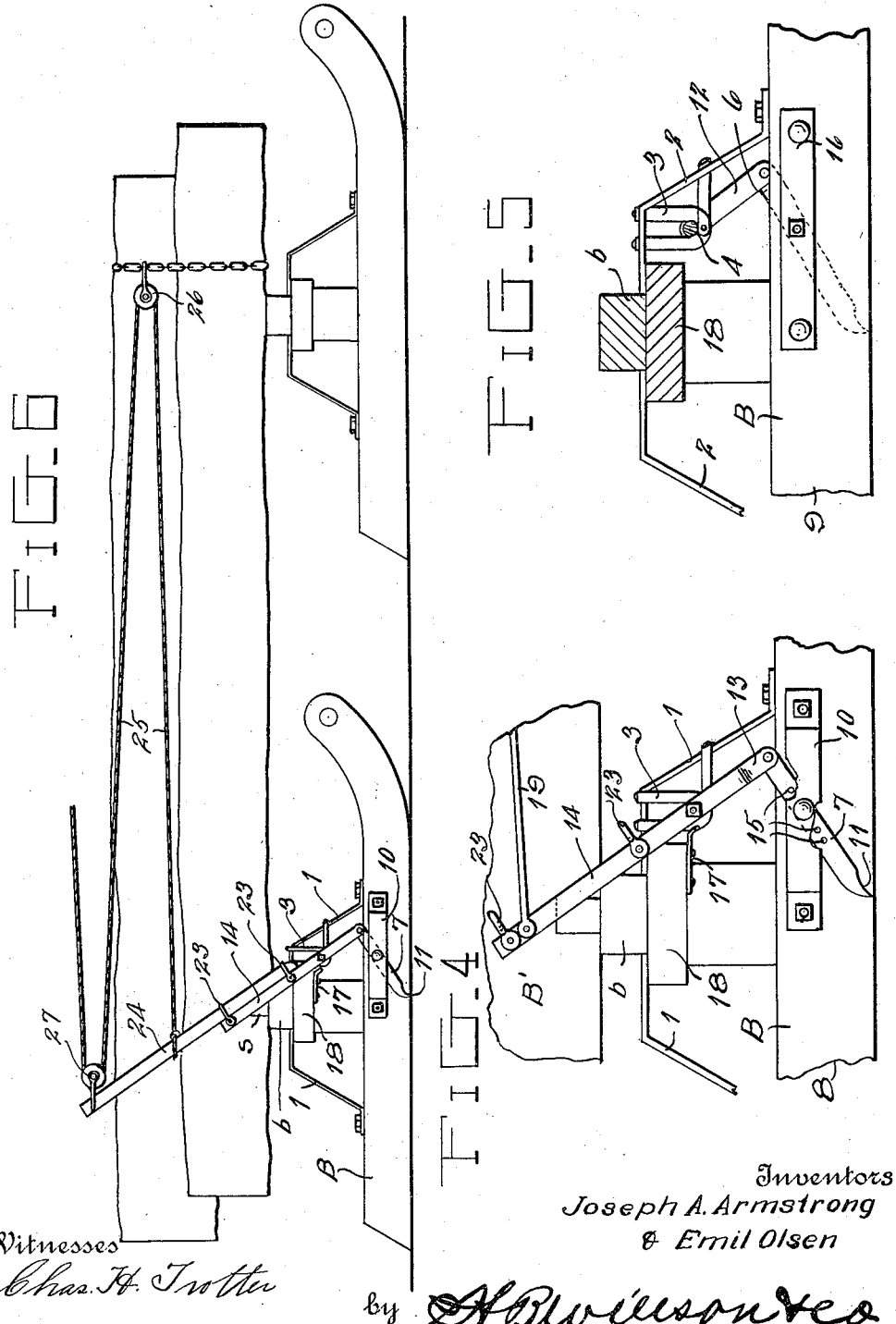

JOSEPH A. ARMSTRONG AND EMIL OLSEN, OF EPHRAIM, UTAH.

SLED-BRAKE.

1,164,905.  Specification of Letters Patent.  Patented Dec. 21, 1915.

Application filed May 20, 1915. Serial No. 29,377.

*To all whom it may concern:*

Be it known that we, JOSEPH A. ARMSTRONG and EMIL OLSEN, citizens of the United States, residing at Ephraim, in the county of Sanpete and State of Utah, have invented certain new and useful Improvements in Sled-Brakes; and we do declare the following to be a full, clear, and exact description of the invention, such as will enable others skilled in the art to which it appertains to make and use the same.

This invention relates to improvements in brakes for sleds or sleighs.

The object of the invention is to provide a simply constructed and efficient brake of this character which may be so mounted on a sled or sleigh that a manipulation of the brake in one direction will force pointed projections into the snow or ice surface at the sides of the runners to thereby retard or stop the movement of the sled, and the movement of the brake lever in an opposite direction will operate to elevate said projections from the surface of the ice or snow and if said brake is not held in applied position it will be automatically released by the forward movement of the sled.

Another object is to provide a brake of this character which will reliably operate under all conditions and which may be readily applied to sleds and sleighs already in use.

With these and other objects in view, the invention consists of certain novel features of construction and the combination and arrangement of parts as will be more fully described and claimed.

In the accompanying drawings: Figure 1 represents a side elevation of a sled equipped with this improved brake and with the brake shown in inoperative position in full lines and in operative position in dotted lines; Fig. 2 is a plan view of the rear portion of the sled showing this improved brake; Fig. 3 is an enlarged side elevation taken from the side of the sled opposite that from which Fig. 1 is taken; Fig. 4 is a similar view taken from the same side of the sled that Fig. 1 is taken; Fig. 5 is a transverse vertical section taken on the line 5—5 of Fig. 2, and Fig. 6 is a side elevation showing a slightly different application of the invention.

In the embodiment illustrated, a bob sled S is shown with the brake constituting this invention shown applied to the rear bob B which is shown provided with the usual bolster $b$. This bolster is provided with the usual standards $s$ to receive a sled box or body B'. Attached to the front of the bolster $b$ at opposite sides of the sled are two brackets 1 and 2 which have longitudinally alined slotted bearings 3 therein to receive and support a shaft 4 which extends transversely across the sled at the front of the bolster $b$ and is designed to move vertically in the slots 3.

Brake levers 6 and 7 are shown fulcrumed intermediately of their ends on the outer faces of the runners 8 and 9 between the outer faces of said runners and longitudinally extending guide straps or guards 10 which are spaced from the sides of the runners a sufficient distance to permit the brake levers to move freely therein. The lower ends of these levers 6 and 7 are pointed and when the levers are disposed in upright position are adapted to project below the lower edges or surface engaging faces of the runners so that these pointed ends 11 when the levers are so disposed will be forced into the ice or snow at the sides of the sled and thus retard its movement, or if sufficient force be exerted thereon will probably stop the sled entirely. The upper ends of these levers 6 and 7 are pivotally connected with arms 12 and 13 carried by the projecting ends of the shaft 4, said shaft ends being squared to receive and hold the arms 12 and 13 and prevent their turning on said shaft. The arm 13 is extended to form an actuating lever 14 by means of which the brake elements or levers 6 and 7 are turned into and out of operative position. These brake levers 6 and 7 are preferably provided with a plurality of longitudinally spaced apertures 15, several of which are located adjacent the central or middle portion of the lever to provide for its adjustable connection with its fulcrum which is here shown passing through the guard straps 10, the runners, and preferably through plates 16 secured on the inner faces of the runners so that a strong supporting structure is shown provided for the brakes. Bumpers 17 are shown in the form of iron straps adjustably mounted on the lower face of the opposite ends of the cross beam 18 on which the bolster b is mounted and which has one end projecting beyond the front face of said beam into the path of the arms 12 and 13 to limit the opening movement of said arms and thereby prevent them from passing beyond a vertical position. These bumpers 17 are preferably slotted to receive their fastening bolts to provide for their adjustment toward and away from said links to compensate for wear or for varying their adjustment for other purposes.

A brake rod 19 is shown connected at one end with the lever 14 and at its other end with an operating lever 20 fulcrumed at the front of the sled preferably on the box or body thereof in convenient position for manipulation by the driver or operator. This lever has a dog 21 which is designed to engage a quadrant 22 for locking said lever 20 in adjusted position whereby the brake levers are held either in operative or inoperative position as may be desired. The lever 14 which constitutes an extension of the arm 13 is preferably provided with a plurality of laterally extending loops 23 which are designed to receive an extension rod or bar 24 to provide for the operation of the brakes at a remote point when the sled is used for hauling lumber or other loads, the boxes or body of the sled being removed when so used, and thereby the rod 19 and lever 20 being also removed. Secured to the extension lever 24 at one end is an operating rope or cable 25 which is then passed around a pulley 26 carried by a chain which passes around the lumber at the front of the sled and after passing over said pulley is carried back and passed over a pulley 27 at the upper end of the extension 24, the free end of said rope being positioned near the front of the sled convenient for ready manipulation by the operator who may ride on the sled or walk at one side thereof.

From the above description it will be obvious that when the parts are in the position shown in Fig. 1, when the brake levers 6 and 7 are in operative position with their front ends extending forwardly, and it is desired to apply the brakes, the lever 14 is moved forwardly, thereby causing the shaft 5 to ride upwardly in the slots 3 and through the arms 12 and 13, elevating the levers 6 and 7 into vertical position, thereby causing the sharpened points or diggers 11 thereof to be projected downwardly into surface-engaging position at the sides of the sled. When these brakes have been so disposed and it is desired to hold them in this position for any length of time, the lever 20 at the front of the sled is locked in engagement with the quadrant and the brakes will remain in this position until the lever is released when the continued forward movement of the sled or sleigh will, by the pressure exerted on the pointed ends of the lever, cause said ends to swing rearwardly and their upper ends forwardly, thereby releasing the brake levers and positioning the points thereof out of operative engagement with the surface over which the sled is passing.

While this brake is shown applied to a bob sled, it is obvious that it may be applied to any form of sleigh or sled and to sleds drawn by power or by hand, as may be desired.

We claim as our invention:

1. In a sled the combination of a vertically movable rock shaft extending transversely of said sled and projecting at its opposite ends beyond the opposite sides of the sled, arms secured to the ends of said shaft, brake levers fulcrumed intermediately of their ends on the sled runners and pivotally connected at their upper ends with the free ends of said arms, said levers being so fulcrumed that their lower ends will project below the lower faces of the sled runners when the arms are in upright position, and means for actuating said rock shaft to open and close said brake levers.

2. The combination with a sled having guards on the outer faces of its runners spaced from said runners, levers adjustably fulcrumed intermediately of their ends between said guards and runners, arms pivotally connected with the upper ends of said brake levers, a rock shaft fixedly connected with said arms, a lever for actuating said rock shaft to open and close said brake levers, and means positioned to engage said actuating means to limit the opening movement of said levers.

3. In a sled the combination of a bolster, brackets disposed at the front of said bolster and having vertically disposed slots therein, a shaft mounted in said slots, means for raising and lowering said shaft in said slots, brake levers fulcrumed intermediately of their ends on said sled runners, their braking ends positioned to extend beyond the lower faces of the runners when said levers are in opened position, and arms connecting said levers with said shaft.

4. In a sled the combination of a bolster, brackets disposed at the front of said bolster and having vertically disposed slots therein, a shaft mounted in said slots, means for raising and lowering said shaft in said slots, brake levers fulcrumed intermediately of their ends on said sled runners, their braking ends positioned to extend beyond the lower faces of the runners when said levers are in opened position, arms connecting said levers with said shaft, and bumpers adjustably mounted on said bolster and disposed in the path of said arms for limiting the opening movement of said brake levers.

In testimony whereof we have hereunto set our hands in presence of two subscribing witnesses.

JOSEPH A. ARMSTRONG.
EMIL OLSEN.

Witnesses:
F. H. RASMUSON,
ERNELL JENSEN.

Copies of this patent may be obtained for five cents each, by addressing the "Commissioner of Patents, Washington, D. C."